United States Patent
Bukhtiyarov et al.

(10) Patent No.: US 6,395,184 B1
(45) Date of Patent: May 28, 2002

(54) METHOD FOR DEHYDRATING CRUDE OIL AND PETROLEUM PRODUCTS AND DEVICE FOR REALIZING THE SAME

(75) Inventors: Valery Ivanovich Bukhtiyarov; Vyacheslav Vladimirovich Erokhin, both of Novosibirsk; Vladimir Ivanovich Serbinenko, Omsk; Vladimir Vladimirovich Serbinenko, Novosibirsk, all of (RU)

(73) Assignee: Obschestvo s Ogranichennoi Otvetstvennostju "Sibmetallservis", Novosibirsk (RU)

( * ) Notice: Subject to any disclaimer, the term of this patent is extended or adjusted under 35 U.S.C. 154(b) by 0 days.

(21) Appl. No.: 09/555,975

(22) PCT Filed: Oct. 14, 1998

(86) PCT No.: PCT/RU98/00328
§ 371 (c)(1),
(2), (4) Date: Jun. 6, 2000

(87) PCT Pub. No.: WO99/29386
PCT Pub. Date: Jun. 17, 1999

(30) Foreign Application Priority Data

Dec. 8, 1997 (RU) .......................................... 97119846

(51) Int. Cl.⁷ .............................................. B01D 17/05
(52) U.S. Cl. .......................... 210/669; 96/184; 96/186; 210/689; 210/708; 210/799; 210/314; 210/266; 210/282; 210/490; 210/DIG. 5
(58) Field of Search .................................. 210/708, 799, 210/314, 316, 317, 489, 490, 492, DIG. 5, 265, 266, 669, 689, 282; 96/184, 186

(56) References Cited

U.S. PATENT DOCUMENTS

| 2,601,904 | A | * | 7/1952 | Erwin | 95/249 |
| 2,731,150 | A | * | 1/1956 | McCann | 210/314 |
| 3,553,940 | A | * | 1/1971 | Piner | 55/174 |
| 3,645,398 | A | * | 2/1972 | Fiocco | 210/DIG. 5 |
| 3,902,997 | A | * | 9/1975 | Hartmann et al. | 210/314 |

FOREIGN PATENT DOCUMENTS

| DE | 3502671 | 7/1986 |
| FR | 2551671 | 3/1985 |
| RU | 2065762 | 8/1996 |
| RU | 2094083 | 10/1997 |

* cited by examiner

Primary Examiner—Peter A. Hruskoci
(74) Attorney, Agent, or Firm—Ladas & Parry

(57) ABSTRACT

Invention relates to methods for water removal from oil, oil products, gas condensate, and liquid hydrocarbons. The suggested invention aims at a more efficient water removal from the flows of hydrocarbons of different origin. Technical task of water removal is implemented via the selective filtration of hydrocarbons through a filtering element consisting of three tilted beds, wherein the first and the third beds are made of a porous-cellular metal or alloy with hydrophobic surface, while intermediate one is made of hydrophilic materials such as the porous-cellular metal or alloy with modified surface, celluloid foam or the cartridges filled with glass balls or glass fiber. The suggested method allows a high degree of water removal from the hydrocarbon medium under continuous regime without water phase settling. Apparatus for the implementation of this method is also described.

13 Claims, 1 Drawing Sheet

Figure 1:
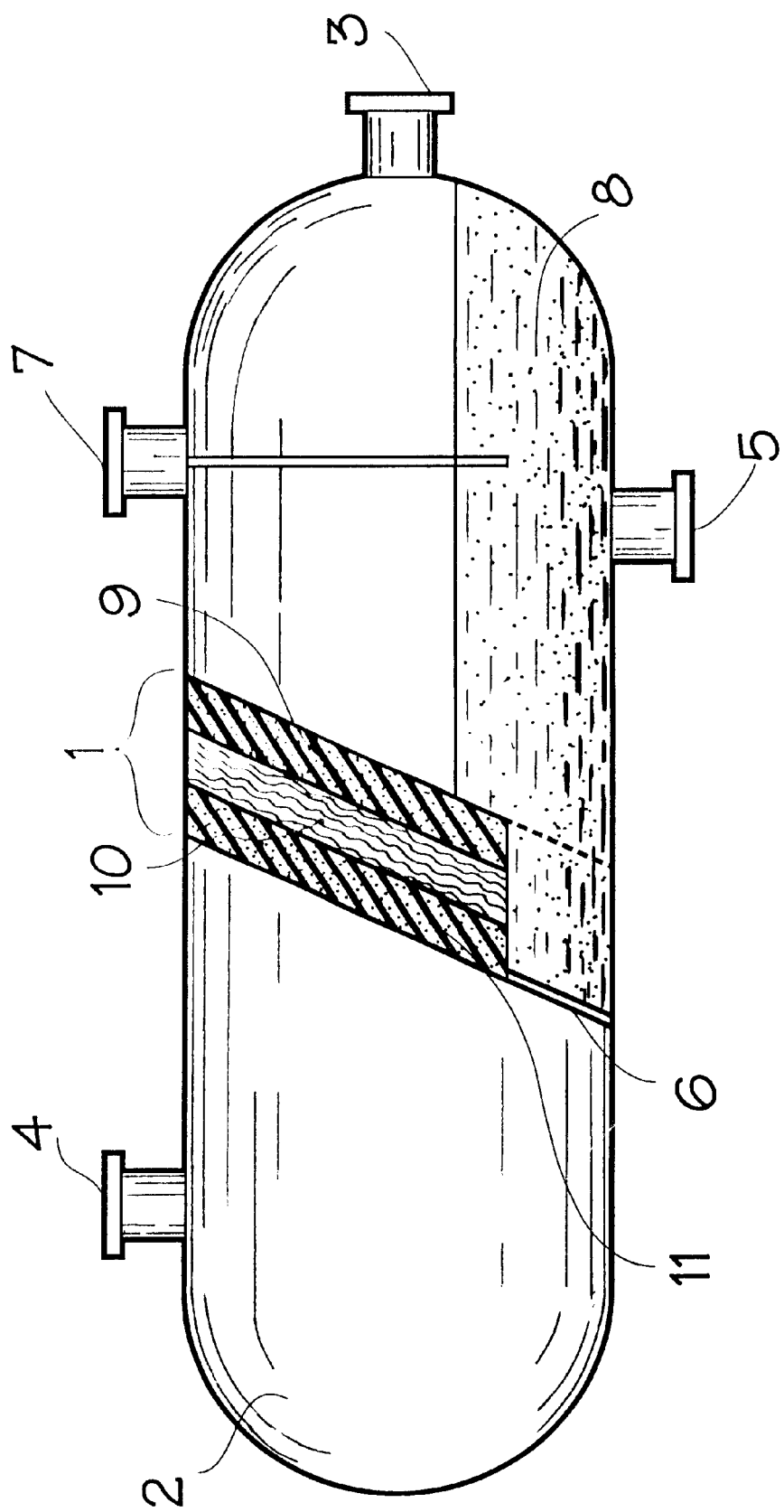

METHOD FOR DEHYDRATING CRUDE OIL AND PETROLEUM PRODUCTS AND DEVICE FOR REALIZING THE SAME

TECHNICAL FIELD

Invention relates to methods for water removal from oil, oil products, gas condense, and liquid hydrocarbons, and to apparatuses for methods implementation.

INVENTION BACKGROUND

A method, which is mostly similar to the present invention by dehydration degree, allows the separation of disperse water phase from a hydrocarbon medium by passing the latter through a device containing three beds of filtering materials. In the first and in the third bed the hydrocarbon medium passes through a fibrous polymer material with hydrophobic properties allowing to retain and thus separate disperse water phase. In the second bed finely dispersed water drops are enlarged on a coalescing material (FR 2551671 AI, B 01 D 17/04, 1985). However, polymer materials such as polypropylene and polyacrylonitrile, used to separate disperse water phase in the prototype, are known to change their properties, when interacting with hydrocarbons. These changes often result in the filtering bed deformation and thus separation worsening, which is obviously a disadvantage of the prototype method.

DETAILED DESCRIPTION OF INVENTION

The present invention aims at a more efficient water removal from the flows of hydrocarbons of different sources of raw materials.

The main aim is achieved by using a method and apparatus providing a high degree of water removal under continuous regime via the selective filtration of hydrocarbons through a filtering element consisting of three tilted beds, wherein the first and the third beds are made of a porous-cellular metal or alloy with hydrophobic surface, while intermediate one is made of hydrophilic materials such as the porous-cellular metal or alloy with modified surface, celluloid foam or the cartridges filled with glass fiber or balls.

The above mentioned porous-cellular metals or alloys meant for filtering are chosen regarding their chemical resistance to the hydrocarbon medium action, possibility to impart them with appropriate hydrophobic or hydrophilic properties during their manufacturing, and regarding well developed porous structure allowing disperse phase coalescence and thus high water removal degree by the expense of hydrocarbons flow turbulence to providing a low pressure drop at the high velocities of hydrocarbon flow.

The suggested method for water removal from oil and oil products involves:

selective filtration (penetration) of hydrocarbon medium through the beds of porous-cellular metal or alloy, wherein large drops of disperse water phase are retained by the first filtering bed due to low water wetting of the hydrophobic metal surface and pour down under gravity and the hydrodynamic pressure of the hydrocarbon raw;

coagulation and subsequent coalescence of water phase drops not larger than the size of the filtering material pores by the expense of hydrocarbon flow turbulization over chaotically disposed partitions of open pores in the filtering material;

coalescence of finely emulsified water drops in the coalescing bed of hydrophilic material, wherein water drops after growing to a certain size pour down under gravity or are carried away (pressed through) by the hydrocarbon flow;

retaining of thus carried (pressed through) water phase drops on the tilted surface of the last filtering bed consisting of porous-cellular metal or alloy possessing pores of minimum size.

The method is carried out by using an apparatus schematically shown in the Drawing 1. Filtering element (1) is mounted inside the apparatus including body (2), inlet for hydrocarbon medium to be de-watered (3), outlet from de-watered hydrocarbon medium (4), outlet for water phase (5) under the tilt of 30–60° depending on the hydrocarbon medium viscosity in order to provide efficient pouring down of water drops. Filtering element leans against a dead end partition (6) thus covering the whole cross section of the apparatus. Interface level is regulated with automated device (7) to remove de-emulsified water (8).

The filtering element contains at least three tilted and parallel filtering beds. The first and the last bed are composed of plates made of porous-cellular metal or alloy with hydrophobic (oleophilic) properties (9, 11), while intermediate bed (beds) is made of material with hydrophilic properties (10) such as porous-cellular metal or alloy with modified surface, celluloid foam or cartridges filled with glass balls or glass fiber. Each filtering bed consists of several densely packed layers of porous-cellular plates. The thickness of filtering beds in the element is determined by the origin of hydrocarbon raw, disperse water phase content, and by the size of water drops.

Water is removed as follows. Emulsified hydrocarbon flow comes into body (2) through inlet (3). The hydrocarbon phase wets the hydrophobic surface of the first filtering bed consisting of metal or alloy (9), and easily passes through the bed, while large emulsified water drops are retained in the bed, since they poorly wet the hydrophobic surface, and pour down along the titled bed surface into the settle (8) under gravity and flow hydrodynamic pressure. Finely emulsified water drops that are smaller in size than pores in the first filtering bed easily penetrate inside the bed, where the hydrocarbon flow becomes turbulent owing to vortexes on chaotically placed pore walls. As a result, small water drops coagulate, and then undergo coalescence. The very find drops, which penetrated through the first filtering bed (9), adsorb on the hydrophilic surface of the intermediate filtering bed (10) by the expense of adhesion forces. The forces retain water drops on the hydrophilic surface, until these drops grow large enough due to coalescence with other particles, and pour down to settler or are carried away by the hydrocarbon flow. The grown drops thus reach the last hydrophobic bed and are retained there by the hydrophobic surface and pour down to settler under gravity and flow hydrodynamic pressure.

Efficient destruction of stable finely disperse water emulsions in hydrocarbons may be improved, if we increase the temperature of hydrocarbon phase and/or introduce de-emulsifiers.

EXAMPLES OF THE INVENTION APPLICATION

Example 1

Diesel fuel flow containing 10% of emulsified water was passed through the filtering device, load on the filtering element being 11.2 $m^3/m^2 \times h$. After filtration water content was 0.01–0.03%, which corresponds to a water removal degree of 95–98.3%. Water content in the diesel fuel before and after filtering was determined with the Dine-Stark method.

Example 2

Diesel fuel flow containing 0.24% of emulsified water was passed through the filtering device, load on the filtering element being 10.5 m$^3$/m$^2$×h. After filtration water content was less than 0.03%, which corresponds to a water removal degree of not less than 87%. Water content in the diesel fuel before and after filtering was determined with the Dine-Stark method.

Example 3

Gasoline containing 0.09 mass. % of emulsified water was passed through the filtering device, load on the filtering element being 18.7 m$^3$/m$^2$×h. After filtration no water was detected in gasoline, which corresponds to a 100% water removal. Water content in gasoline before and after filtering was determined with the Fisher method.

Example 4

Gas condensate flow (butane-butylene fraction) containing 10% of emulsified water was passed through the filtering device under 2.4–3.5 kg/cm$^2$, load on the filtering element being 10 m$^3$/m$^2$×h. After filtration water content was 0.0135 mass. %, which corresponds to a water removal degree of 96.6%.

Example 5

Gas condensate flow (propane-propylene fraction) was passed through the filtering device under 15–18 kg/cm$^2$, load on the filtering element being 14.5 m$^3$/m$^2$×h. After filtration water content in the fraction was reduced from 0.3 mass. % to 0.0192 mass. %, which corresponds to a water removal degree of 93.1%.

INDUSTRIAL APPLICABILITY

The suggested method for water removal from oil, oil products, gas condensate and liquid hydrocarbons, and apparatus for its implementation may be used for the purposes of chemical industry, gas and oil processing, for conditioning oil and gas for transportation, and for the upgrading of oil products with respect to disperse water content.

The above described method allows a high degree of water removal from the hydrocarbon medium under continuous regime without water phase settling.

What is claimed is:

1. An apparatus for the removal of water dispersed in a hydrocarbon medium, the apparatus comprising:
   (a) a housing body comprising an inlet for the hydrocarbon medium to enter the body, a water outlet disposed at a bottom portion of the body and an outlet for the hydrocarbon medium to exit the body;
   (b) first, intermediate and third filtering beds disposed within the body such that the hydrocarbon medium passing from the inlet to the outlet flows first through the first filtering bed and then through the intermediate filtering bed and then through the third filtering bed and such that, with the body disposed in a horizontal position, the first, intermediate and third filtering beds are tilted with respect to both the horizontal position and a vertical position; said first and third filtering beds comprising porous-cellular metal or alloy with hydrophobic properties such that the first and third filtering beds retain emulsified water droplets that are larger in size than pores of the first and third filtering beds and cause retained water droplets to pour down along respective surfaces of the first and third filtering beds for removal through said water outlet, said first and third filtering beds permitting emulsified water droplets that are smaller in size than the pores to penetrate the first and third filtering beds, said intermediate filtering bed comprising a hydrophilic surface material that absorbs and retains water droplets penetrating the first filtering bed such that water droplets retained on the hydrophilic surface material coalesce on the hydrophilic surface material to form coalesced water droplets that are large enough to pour down the hydrophilic surface for removal or to be retained by the third filtering bed.

2. The apparatus of claim 1, wherein the hydrophilic surface material of the intermediate filtering bed comprises a porous-cellular metal or alloy with a modified surface, said porous-cellular metal or alloy being chemically resistant to the hydrocarbon medium.

3. The apparatus of claim 2, wherein the first and third filtering beds comprise plates of porous-cellular metal or alloy that are chemically resistant to the hydrocarbon medium.

4. A method for the removal of water dispersed in a hydrocarbon medium, the method comprising:
   (a) providing the apparatus of claim 3;
   (b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

5. A method for the removal of water dispersed in a hydrocarbon medium, the method comprising:
   (a) providing the apparatus of claim 2;
   (b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

6. The apparatus of claim 1, wherein the hydrophilic surface material of the intermediate filtering bed comprises a celluloid foam.

7. A method for the removal of water dispersed in a hydrocarbon medium, the method comprising:
   (a) providing the apparatus of claim 6;
   (b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

8. The apparatus of claim 1, wherein the hydrophilic surface material of the intermediate filtering bed comprises cartridges filled with glass balls or glass fiber.

9. A method for the removal of water dispersed in a hydrocarbon medium, the method comprising:
   (a) providing the apparatus of claim 8,
   (b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

10. The apparatus of claim 1, wherein the first and third filtering beds comprise plates of porous-cellular metal or alloy that are chemically resistant to the hydrocarbon medium.

11. A method for the removal of water dispersed in a hydrocarbon medium, the method comprising:

(a) providing the apparatus of claim 10, (b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

12. A method for the removal of water dispersed in a hydrocarbon medium, the method comprising:

(a) providing the apparatus of claim 1;

(b) passing the hydrocarbon medium with water dispersed therein through the inlet of the apparatus such that it flows through the first, intermediate and third filtering beds in sequence and exits the body through the outlet for the hydrocarbon medium whereby to cause water dispersed in the medium to be retained by the first, intermediate or third filtering beds and removed from the hydrocarbon medium through said water outlet.

13. The method according to claim 12, further comprising adding de-emulsifiers to the hydrocarbon medium.

* * * * *